US008891621B2

(12) United States Patent  
Igarashi

(10) Patent No.: US 8,891,621 B2  
(45) Date of Patent: Nov. 18, 2014

(54) IMAGE CODING APPARATUS AND IMAGE CODING METHOD

(75) Inventor: Susumu Igarashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1346 days.

(21) Appl. No.: 11/844,677

(22) Filed: Aug. 24, 2007

(65) Prior Publication Data

US 2008/0056365 A1 Mar. 6, 2008

(30) Foreign Application Priority Data

Sep. 1, 2006 (JP) .................................. 2006-238168

(51) Int. Cl.
*H04N 7/00* (2011.01)
*H04N 19/51* (2014.01)
*H04N 19/57* (2014.01)
*H04N 19/53* (2014.01)
*H04N 19/103* (2014.01)

(52) U.S. Cl.
CPC ........... *H04N 7/465* (2013.01); *H04N 7/26856* (2013.01); *H04N 7/26776* (2013.01); *H04N 7/26026* (2013.01); *H04N 7/26736* (2013.01)
USPC ................. 375/240.13; 375/240.16; 382/238; 382/239; 382/236; 382/264

(58) Field of Classification Search
USPC ........ 375/240.13, 240.16; 382/236, 238, 239, 382/264
See application file for complete search history.

(56) References Cited

U.S. PATENT DOCUMENTS

| 4,470,772 | A | * | 9/1984 | Gannaway .................... 417/368 |
| 5,226,085 | A | * | 7/1993 | Di Francesco ................ 704/219 |
| 5,729,295 | A | * | 3/1998 | Okada ....................... 375/240.13 |
| 5,808,700 | A | * | 9/1998 | Sugimoto et al. ............. 348/699 |
| 5,848,194 | A | | 12/1998 | Ishizuka et al. ................ 382/234 |
| 6,031,575 | A | * | 2/2000 | Suzuki et al. ............. 375/240.14 |
| 6,144,769 | A | * | 11/2000 | Sato et al. ..................... 382/236 |
| 6,411,229 | B2 | * | 6/2002 | Kobayashi ..................... 341/67 |
| 6,470,050 | B1 | * | 10/2002 | Ohtani et al. ............. 375/240.16 |
| 6,603,413 | B2 | | 8/2003 | Igarashi et al. ................. 341/67 |
| 6,614,847 | B1 | * | 9/2003 | Das et al. ................. 375/240.16 |

(Continued)

FOREIGN PATENT DOCUMENTS

JP 63-209383 8/1988
JP 1-027380 A 1/1989

(Continued)

OTHER PUBLICATIONS

Qiang Shen, "Fuzzy image smoothing," Pattern Recognition, 1990. Proceedings., 10th International Conference on, vol. ii, no., pp. 74,78 vol. 2, Jun. 16-21, 1990.*

(Continued)

*Primary Examiner* — Luu Pham
*Assistant Examiner* — Kari Schmidt
(74) *Attorney, Agent, or Firm* — Fitzpatrick, Cella, Harper & Scinto

(57) ABSTRACT

To use both intraframe prediction coding and interframe prediction coding, and at the same time restrict a transfer volume of reference data used in motion detection in interframe prediction coding. In a coding apparatus that compression-codes moving images, both intraframe prediction coding and interframe prediction coding are applied and prediction coding is carried out using a prediction image produced by the coding system deemed to have the higher coding efficiency.

10 Claims, 6 Drawing Sheets

(56) References Cited

U.S. PATENT DOCUMENTS

| | | | |
|---|---|---|---|
| 6,760,480 B2 * | 7/2004 | Hata et al. | 382/239 |
| 6,947,602 B2 | 9/2005 | Igarashi et al. | 382/235 |
| 6,993,202 B2 | 1/2006 | Igarashi et al. | 382/246 |
| 7,127,119 B2 | 10/2006 | Igarashi et al. | 382/250 |
| 7,218,788 B2 | 5/2007 | Igarashi et al. | 382/239 |
| 7,602,440 B2 * | 10/2009 | Nishi et al. | 348/441 |
| 7,916,788 B2 * | 3/2011 | Asano et al. | 375/240.14 |
| 7,973,683 B2 * | 7/2011 | Choo et al. | 341/107 |
| 7,978,766 B2 * | 7/2011 | Song et al. | 375/240.03 |
| 2003/0152279 A1 * | 8/2003 | Ohtani et al. | 382/236 |
| 2004/0066847 A1 * | 4/2004 | Adachi et al. | 375/240.13 |
| 2004/0213344 A1 * | 10/2004 | Hirase et al. | 375/240.2 |
| 2004/0223548 A1 * | 11/2004 | Kato et al. | 375/240.16 |
| 2005/0238246 A1 * | 10/2005 | Wang et al. | 382/250 |
| 2005/0254010 A1 * | 11/2005 | Kato et al. | 352/59 |
| 2007/0025444 A1 * | 2/2007 | Okada et al. | 375/240.16 |
| 2009/0067501 A1 * | 3/2009 | Boon et al. | 375/240.16 |

FOREIGN PATENT DOCUMENTS

| | | |
|---|---|---|
| JP | 7-123406 A | 5/1995 |
| JP | 07154801 | 6/1995 |
| JP | 8-298665 A | 11/1996 |

OTHER PUBLICATIONS

Huo, Chengfu et al. "Lossless compression of hyperspectral images based on searching optimal multibands for prediction." Geoscience and Remote Sensing Letters, IEEE 6.2 (2009): 339-343.*

R. Li, B. Zeng, and M. L. Liou, "A New Three-Step Search Algorithm for Block Estimation," IEEE Transactions on Circuits and Systems for Video Technology ., vol. 4, No. 4, pp. 438-442, Aug. 1994.

L. M. Po and W.C. Ma, "A Novel Four-Step Search Algorithm for Fast Block Estimation," IEEE Transactions on Circuits and Systems for Video Technology ., vol. 6, No. 3, pp. 313-317, Jun. 1996.

Zhu and K.-K. Ma, "A New Diamond-Search Algorithm for Fast Block-Matching Motion Estimation," IEEE Transactions on Image Processing, vol. 9, No. 2, pp. 287-290, Feb. 2000.

* cited by examiner

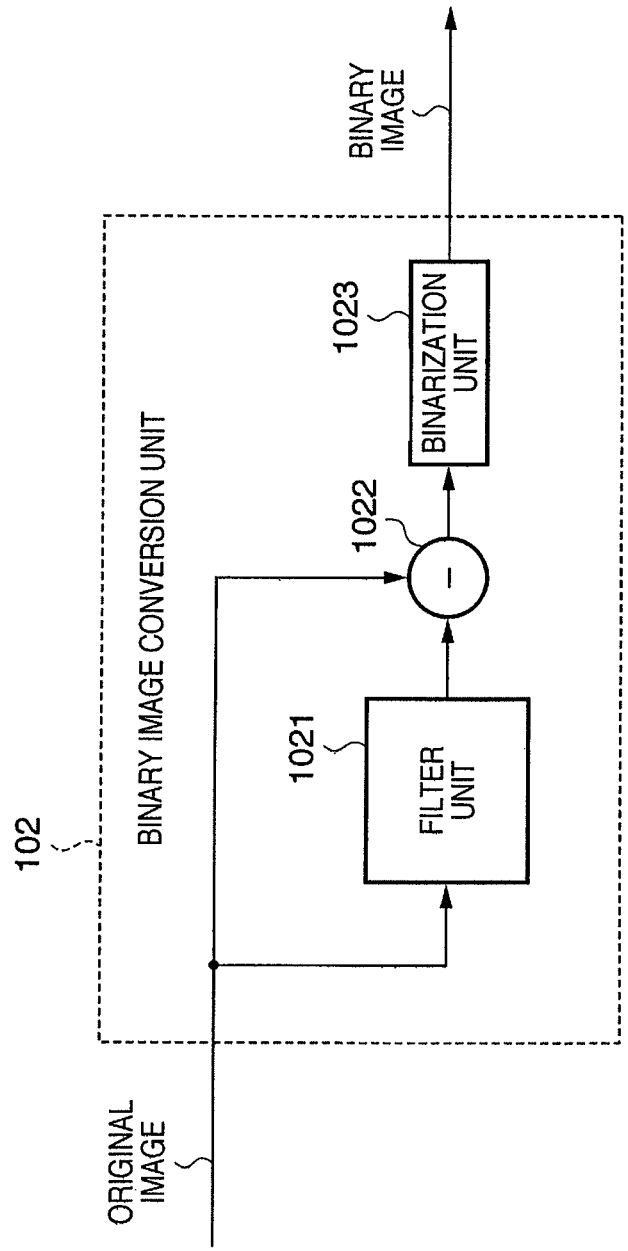

FIG. 3A

| 0 | 1 | 0 |
|---|---|---|
| 1 | 0 | 1 |
| 0 | 1 | 0 |

FIG. 3B

| 0 | 0 | 1 | 0 | 0 |
|---|---|---|---|---|
| 0 | 0 | 0 | 0 | 0 |
| 1 | 0 | 0 | 0 | 1 |
| 0 | 0 | 0 | 0 | 0 |
| 0 | 0 | 1 | 0 | 0 |

FIG. 3C

| 0 | 0 | 0 | 1 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 1 | 0 | 0 | 0 | 0 | 0 | 1 |
| 0 | 0 | 0 | 0 | 0 | 0 | 0 |
| 0 | 0 | 0 | 0 | 0 | 0 | 0 |
| 0 | 0 | 0 | 1 | 0 | 0 | 0 |

IMAGE CODING APPARATUS AND IMAGE CODING METHOD

BACKGROUND OF THE INVENTION

1. Field of the Invention

The present invention relates to image coding technology, and more particularly, to image coding technology that uses motion compensation.

2. Description of the Related Art

As compression coding systems set as international standards, ITU-T Recommendation H.264 or ISO/IEC international Standard 14496-10 (hereinafter simply H.264) and MPEG2 are known.

In these coding systems, an image is divided into a plurality of rectangle blocks (macroblocks) and coded in units of macroblocks. In addition, use is made of the high temporal and spatial correlation between frame images that constitute moving images in order to reduce coding volume.

As a coding system that makes use of temporal correlation, a compensation interframe prediction coding system is widely used. This system detects motion information (motion vectors) of coding target macroblocks and codes a difference between a prediction image generated using this motion information and the coding target macroblock.

In addition, as a coding system that makes use of spatial correlation, an intraframe prediction coding system is widely used. This system generates a prediction image using pixels in macroblocks around the coding target macroblock within the same frame and codes the difference between the prediction image generated and the coding target macroblock.

The intraframe prediction system in particular, because it has many prediction modes to handle a plurality of prediction directions, has high intraframe prediction accuracy compared to other coding systems. Details of the intraframe coding tools in H.264 as well as of other coding tools may be found in their respective recommendations.

Although a variety of different coding systems have come to be standardized as the types of images to be coded have become more diverse, with respect to the motion detection in motion compensation interframe coding systems, the conventional techniques remain unchanged even in the newly standardized coding systems.

As conventional motion detection techniques, there are those like the ones described in the following:

JP-A-H07-154801,

R. Li, B. Zeng, and M. L. Liou, "A new three-step search algorithm for block estimation," *IEEE Trans. Circuits Syst. Video Technol.*, vol. 4, pp. 438-442, August 1994, L. M. Po and W. C. Ma, "A Novel four-step search algorithm for fast block estimation," *IEEE Trans. Circuits Syst. Video Technol.*, vol. 6, pp. 313-317, June 1996, and S. Zhu and K.-K. Ma, "A new diamond-search algorithm for fast block-matching motion estimation," *IEEE Trans. Image Processing*, vol. 9, pp. 287-290, February 2000.

At this point, a brief description is given of the usual motion detection technique by block-matching carried out conventionally.

FIG. 6 is a diagram showing schematically a configuration according to a motion detection process in a conventional coding apparatus.

In the drawing, a motion detection apparatus 601 is connected to a reference frame memory 604 via a bus 603. In the reference frame memory 604 is stored a reference frame referenced for motion detection of a current target frame. The motion detection apparatus 601 is further provided with a search area RAM 602 that stores reference data of a search area needed for the process of motion detection of the current target block.

The motion detection apparatus 601, when carrying out motion detection of the current target block, first reads out the search area reference data from the reference frame memory 604 via the bus 603 and stores the reference data in the search area RAM 602. Then, the motion detection apparatus 601 carries out sequential matching while shifting the positions of the current target block data and the reference data in the search area RAM 602 and detects the position having the highest degree of similarity as the motion vector.

The reference data changes with each target block, but, as shown in FIG. 5, portions of the search area of the block currently being processed and the search area of the block just processed overlap, and as a result, when writing the reference data to the search area RAM 602, normally only the data of the search area omitting the overlapping portion is written.

In recent years, with respect to the coding target moving image contents, the trend is toward an increase in the number of pixels per frame and an increase in the frame rate, leading to an increase in the volume of data to be coded per unit of time.

As a result, the data transfer volume per unit of time of the bus 603 in the process of reading out the motion detection area reference data from the reference frame memory 604 via the bus 603 and storing the reference data in the search area RAM 602 increases. Generally, the reference frame memory 604 is often a portion of a shared memory space also used by the CPU of an image coding apparatus and the like that includes the motion detection apparatus 601 or by another image processing unit.

As a result, an increase in the transfer volume from the reference frame memory 604 to the search area RAM 602 affects processing by the other constituent elements that use the shared memory, and in some cases can interfere with the correct operation of the image coding apparatus as a whole.

In order to prevent such an occurrence, it is necessary to take such measures as making the reference frame memory 604 not a portion of the space of the shared memory but provided as a separate, dedicated memory. However, such a countermeasure is undesirable because it increases the scale and cost of the circuitry.

In the conventional coding apparatus that implements a coding system that uses both intraframe prediction coding and interframe prediction coding such as H.264, no consideration was given to compatibility with intraframe prediction coding during the process of motion detection used in interframe prediction coding.

In addition, new coding systems such as H.264, although they have better coding efficiency than previous coding systems, are complicated and require many calculations, making it difficult to restrain increases in coding time and increases in circuit scale.

Moreover, in conventional motion detection the data transfer volume for the purpose of preparing search area reference data groups is large, which taxes the bus band.

SUMMARY OF THE INVENTION

The present invention is conceived in light of the problems of the conventional art described above, and reduces the data transfer volume required for motion detection as well as the amount of computation required for coding in an image coding apparatus and an image coding method that use both intraframe prediction coding and interframe prediction coding.

According to an aspect of the present invention, there is provided an image coding apparatus that codes a frame of a moving image in units of blocks, comprising: an intraframe prediction unit that generates, for an input moving image target block, a first prediction image block from within a same frame as the target block; an interframe prediction unit that generates, for the target block, a second prediction image block from within a frame different from that of the target block; a selection unit that selects one of either the intraframe prediction unit or the interframe prediction unit in accordance with a predetermined evaluation method; an N-ary image conversion unit that reduces a number of gradations of the target block and generates a N-arized target block (where N is an integer equal to or greater than 2); and a storage unit that stores output of the N-ary image conversion unit, the interframe prediction unit comprising: a motion detection unit that detects motion of the N-arized target block using output of the N-ary image conversion unit and output from the storage unit; and a prediction image generation unit that generates the second prediction block based on detection results detected by the motion detection unit.

According to another aspect of the present invention, there is provided an image coding apparatus that codes a frame of a moving image in units of blocks, comprising: an intraframe prediction unit that generates, for an input moving image target block, a first prediction image block from within a same frame as the target block; an interframe prediction unit that generates, for the target block, a second prediction image block from within a frame different from that of the target block; a selection unit that selects one of either the intraframe prediction unit or the interframe prediction unit in accordance with a predetermined evaluation method; a local decoding unit that locally decodes a coded image; a first N-ary image conversion unit that reduces a number of gradations of the target block and generates a N-arized target block (where N is an integer equal to or greater than 2); a second N-ary image conversion unit that reduces the number of gradations of an output image of the local decoding unit and generates a N-arized image (where N is an integer equal to or greater than 2); and a storage unit that stores output of the second N-ary image conversion unit, the interframe prediction unit comprising: a motion detection unit that detects motion of the N-arized target block using output of the first N-ary image conversion unit and output from the storage unit; and a prediction image generation unit that generates the second prediction block based on detection results detected by the motion detection unit.

According to further aspect of the present invention, there is provided an image coding method for coding a frame of a moving image in units of blocks, comprising: intraframe prediction step of generating, for an input moving image target block, a first prediction image block from within a same frame as the target block; interframe prediction step of generating, for the target block, a second prediction image block from within a frame different from that of the target block; selection step of selecting one of either the intraframe prediction step or the interframe prediction step in accordance with a predetermined evaluation method; N-ary image conversion step of reducing a number of gradations of the target block and generating a N-arized target block (where N is an integer equal to or greater than 2); and storage step of storing results of the N-ary image conversion step in a storage unit, the interframe prediction step comprising: motion detection step of detecting motion of the N-arized target block using results of the N-ary image conversion step and information stored in the storage unit; and prediction image generation step of generating the second prediction block based on detection results detected in the motion detection step.

According to yet further aspect of the present invention, there is provided an image coding method for coding a frame of a moving image in units of blocks, comprising: intraframe prediction step of generating, for an input moving image target block, a first prediction image block from within a same frame as the target block; interframe prediction step of generating, for the target block, a second prediction image block from within a frame different from that of the target block; selection step of selecting one of either the intraframe prediction step or the interframe prediction step in accordance with a predetermined evaluation method; local decoding step of locally decoding a coded image; first N-ary image conversion step of reducing a number of gradations of the target block and generating a N-arized target block (where N is an integer equal to or greater than 2); second N-ary image conversion step of reducing the number of gradations of an output image in the local decoding step and generating a N-arized image (where N is an integer equal to or greater than 2); and storage step of storing output of the second N-ary image conversion step in a storage unit, the interframe prediction step comprising: motion detection step of detecting motion of the N-arized target block using output of the first N-ary image conversion step and output from the storage unit; and prediction image generation step of generating the second prediction block based on detection results detected in the motion detection step.

Such a configuration enables the data transfer volume required for motion detection as well as the amount of computation required for coding to be reduced in an image coding apparatus and an image coding method that use both intraframe prediction coding and interframe prediction coding.

Further features of the present invention will become apparent from the following description of exemplary embodiments with reference to the attached drawings.

BRIEF DESCRIPTION OF THE DRAWINGS

FIG. 2 is a diagram showing an interior configuration of a binary image conversion unit 102 shown in FIG. 1;

FIGS. 3A-3C are diagrams showing examples of two-dimensional tap coefficients of a spatial filter applicable as a filter unit 1021 of the binary image conversion unit 102 shown in FIG. 2;

DESCRIPTION OF THE EMBODIMENTS

Preferred embodiments of the present invention will now be described in detail in accordance with the accompanying drawings.

Figure 1:
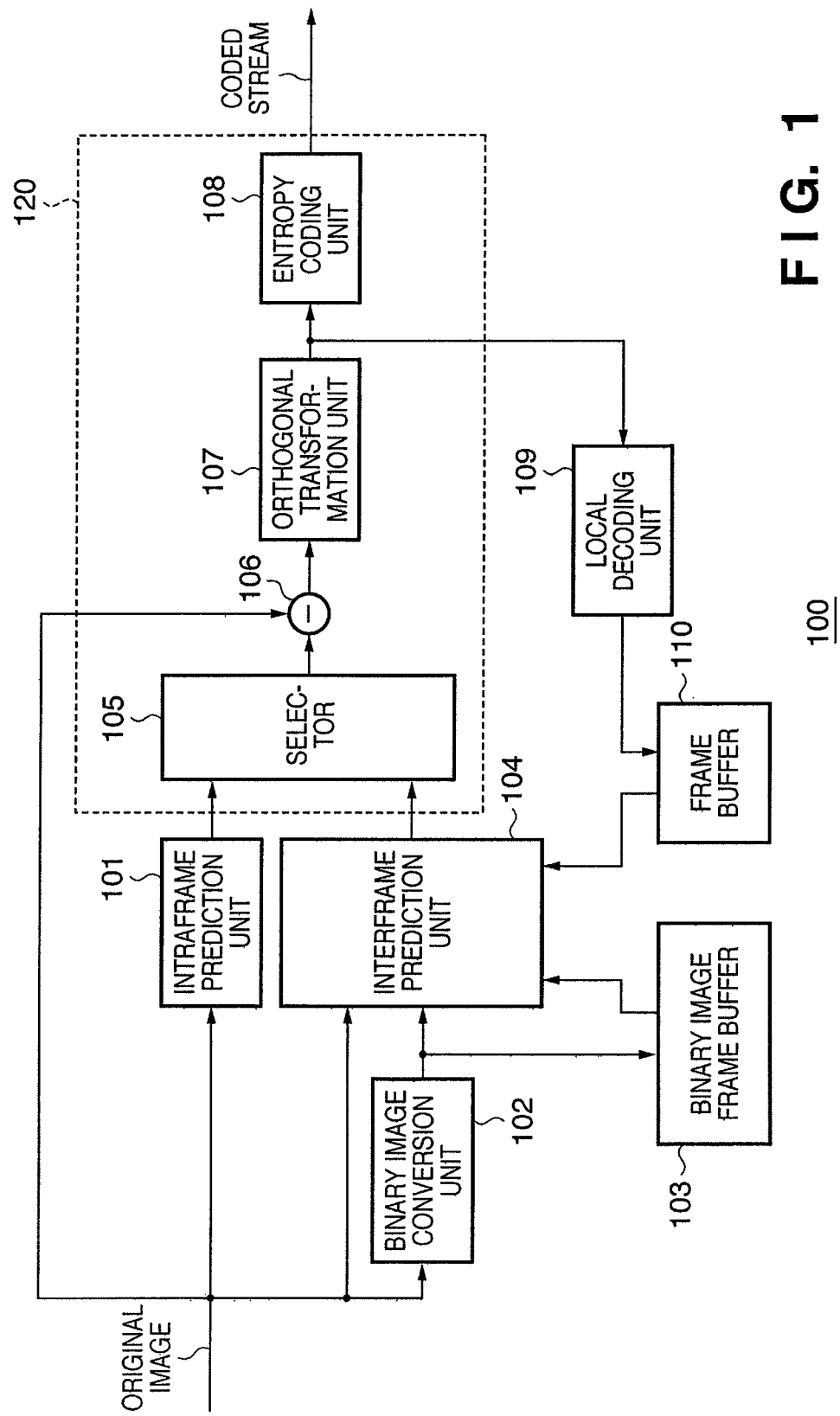
FIG. 1 is a diagram showing a configuration of an image coding apparatus according to a first embodiment of the present invention.

FIG. 1 is a diagram showing a configuration of an image coding apparatus according to a first embodiment of the present invention.

A moving image coding apparatus 100 is comprised of the following constituent elements: An intraframe prediction unit

101, a binary image conversion unit 102, a binary image frame buffer 103, an interframe prediction unit 104, a selector 105, a difference generator 106, an orthogonal transformation unit 107, an entropy coding unit 108, a local decoding unit 109 and a frame buffer 110.

The frame of an original image input as a coding target image is divided into rectangle areas each of which is input in units of blocks themselves composed of a plurality of pixel groups to the intraframe prediction unit 101, the binary image conversion unit 102, the interframe prediction unit 104 and the difference generator 106.

The intraframe prediction unit 101 performs interframe prediction from the input original image and generates an intraframe prediction image that it then outputs to the selector 105.

The binary image conversion unit 102 extracts characteristics of high-frequency components of the input original image and generates a binary image that it then outputs to the interframe prediction unit 104 and to the binary image frame buffer 103.

The binary image frame buffer 103 holds and stores the binary image output by the binary image conversion unit 102, and, after delaying until at least the next frame, outputs the output binary image to the interframe prediction unit 104 as a binary delayed frame image, that is, a reference frame image.

The interframe prediction unit 104 carries out interframe prediction based on the original image, the binary image, the binary delayed frame image, and the delayed frame image and generates an interframe prediction image that it then outputs to the selector 105.

The selector 105 selects either the intraframe prediction image output by the intraframe prediction unit 101 or the interframe prediction image output by the interframe prediction unit 104, which it then outputs to the difference generator 106 as a selected prediction image.

The difference generator 106 generates a difference between the original image and the selected prediction image output by the selector 105 that it then outputs to the orthogonal transformation unit 107 as a prediction difference image.

The orthogonal transformation unit 107 performs orthogonal transformation and quantization of the prediction difference image output by the difference generator 106, and outputs the result as a quantized transformation coefficient to the entropy coding unit 108 and the local decoding unit 109.

The entropy coding unit 108 performs entropy coding on each of the transformation coefficient output from the orthogonal transformation unit 107, intraframe prediction mode information, not shown, and interframe prediction motion information not, shown, and outputs the result as a coded stream.

The selector 105, the difference generator 106, the orthogonal transformation unit 107, and the entropy coding unit 108 together comprise a coding unit 120. The coding unit 120 functions as a means for coding the prediction difference image between the selected intraframe prediction image or the selected interframe prediction image, on the one hand, and the target block on the other.

The local decoding unit 109 performs dequantization and reverse orthogonal transformation on a conversion coefficient output by the orthogonal transformation unit 107, and outputs the result to the frame buffer 110 as a locally decoded image.

The frame buffer 110 holds and stores the locally decoded image output by the local decoding unit 109, and after delaying until at least the next frame outputs it to the interframe prediction unit 104 as a delayed frame image.

Next, a description is given of the operation of the moving image coding apparatus of an embodiment of the present invention.

When an original image, which is a multi-valued image (M(M>2) value image), is input, the intraframe prediction unit 101 carries out intraframe prediction in units of rectangle blocks of predetermined size (hereinafter referred to simply as blocks). The intraframe prediction unit 101 determines the appropriate mode (prediction direction, prediction unit block size, and so forth), and generates and outputs an intraframe prediction image (a first prediction image block) that predicts pixels inside the blocks from the corresponding adjacent pixels.

In addition, the intraframe prediction unit 101 computes for example a SAD value described below as an index that evaluates a degree of similarity between the generated intraframe prediction image and the image of the target block. The value of the index may be used as a reference when selecting the prediction image at the selector 105, for example.

At the same time, the original image is also input to the binary image conversion unit 102, where a binarization process is applied in units of blocks.

FIG. 2 is a diagram showing an interior configuration of the binary image conversion unit 102 shown in FIG. 1.

The binary image conversion unit 102 is comprised of a filter unit 1021, a difference generator 1022, and a binarization unit 1023. The original image is input in units of blocks to the filter unit 1021 and to the difference generator 1022. At the filter unit 1021 the input original image blocks are filtered and output to the difference generator 1022 as a filtered image.

The filter unit 1021 is a filter for extracting the characteristics of the high-frequency components of the original image together with the difference generator 1022 described below, for which a low-pass filter for which the cutoff frequency is below the spatial frequency component of the original image, for example, may be used. As the low-pass filter used in the filter unit 1021, for example, a spatial filter having a two-dimensional tap coefficient like those shown in FIG. 3A-3C may be used. By using many pixels on the periphery of the block depending on the number of taps of the filter, the adverse effects of the block ends due to division into blocks is reduced. The difference generator 1022 obtains the difference between the original image and the filtered image output by the filter unit 1021 and outputs the difference to the binarization unit 1023 as a high-frequency components extracted image.

By obtaining the difference between the pixel values of the original image and the corresponding pixel values of the filtered image filtered by the low-pass filter, a distinctive image of the high-frequency components of the original image can be obtained. The high-frequency component extracted image output by the difference generator 1022 is binarized at the binarization unit 1023 and output as a binary image. The binarization unit 1023 binarizes the pixel values of the high-frequency components extracted image, such that, for example, pixels at or above a certain value, for example 1, are coded as "1" and pixels not at or above the certain value are coded as The binary image thus obtained by the binary image conversion unit 102 is a binary image that reflects the characteristics of the high-frequency components of the original image. Why a binary image that reflects the characteristics of the high-frequency components of the original image is used is largely for the reasons described below.

The first reason is that the image data volume can be drastically reduced by using a binary image, which makes it possible to reduce the access volume to the binary image frame buffer 103 as well as the amount of computation required for motion detection.

The second reason is that use of a binary image that reflects the characteristics of the high-frequency components makes it easy for the difference between frames, that is, the motion characteristics, to show up. As a result, using a binary image that reflects the characteristics of the high-frequency components for motion detection makes it possible to detect motion accurately if the image is one for which the original image has sufficient high-frequency components.

The third reason is that, when used in conjunction with intraframe prediction, which utilizes spatial correlation, high coding efficiency can be obtained as a result. As described above, if the image is one for which the original image has sufficient high-frequency components, motion can be detected accurately by using a binary image. However, if the image is one for which the original image does not have sufficient high-frequency components, the characteristics of the image are not readily reflected in the binary image and the accuracy of motion detection declines. On this point, in intraframe prediction, because prediction pixels are generated from adjacent pixels, prediction accuracy increases the greater the correlation between pixels, that is, the fewer high-frequency components the image has. Therefore, intraframe prediction is effective for original images with fewer high-frequency components.

In actual moving images, in a case in which there is much motion within the frame due to rapid panning and the like, the correlation between adjacent pixels increases and the high-frequency components tend to decrease, and therefore the prediction accuracy of intraframe prediction increases. Consequently, by carrying out intraframe prediction utilizing spatial correlation simultaneous with carrying out motion detection using a binary image that reflects the characteristics of the high-frequency components and carrying out interframe prediction, overall high coding efficiency can be achieved.

The binary image block obtained in the binary image conversion unit 102, because it is used in motion detection of the current target original image block, is sent to the interframe prediction unit 104. Further, because the binary image block is used as a reference image during motion detection of the next frame image and thereafter, it is sent to and stored in the binary image frame buffer 103.

Figure 4:
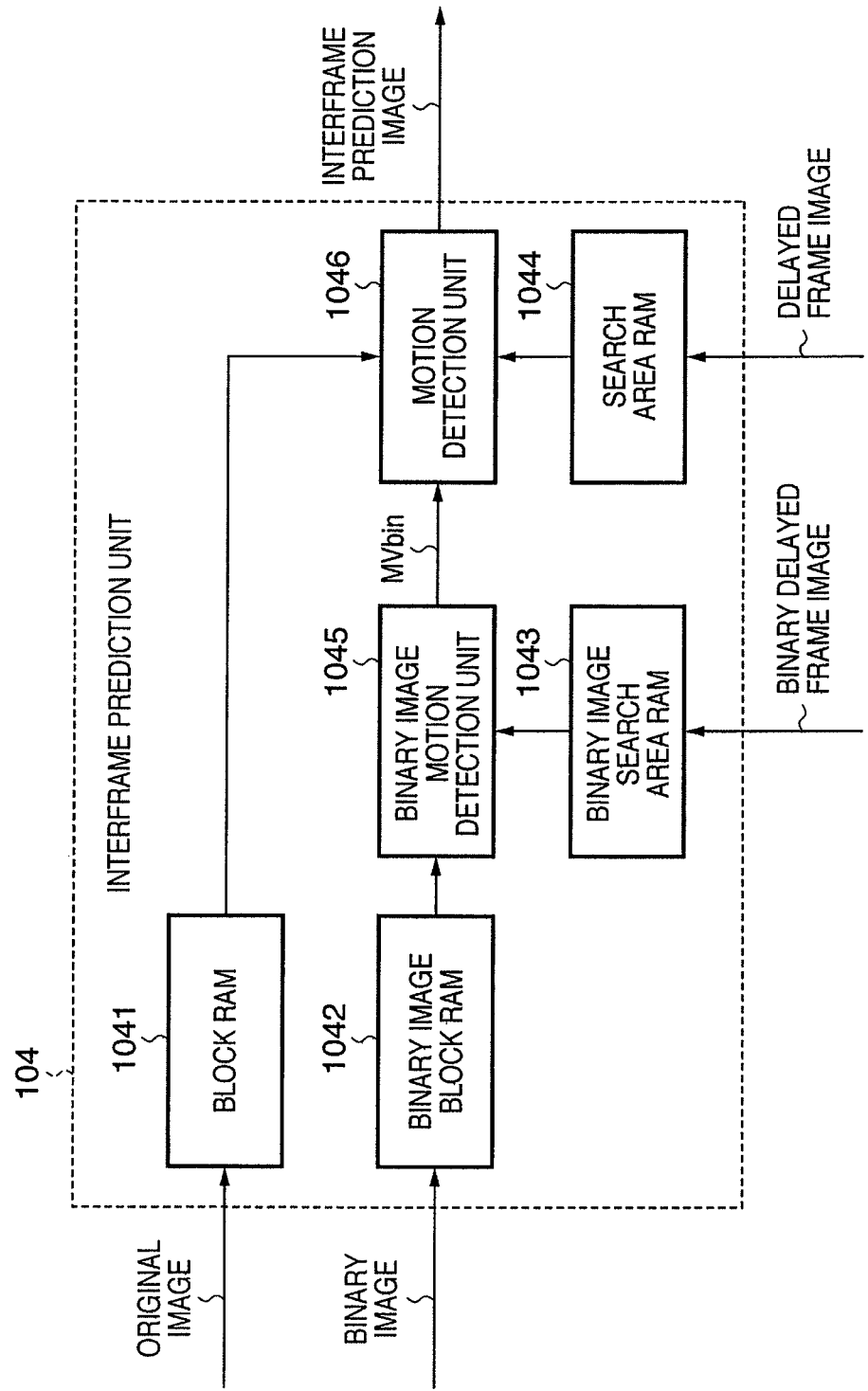
FIG. 4 is a diagram showing an interior configuration of an interframe prediction unit 104 shown in FIG. 1.
Figure 5:
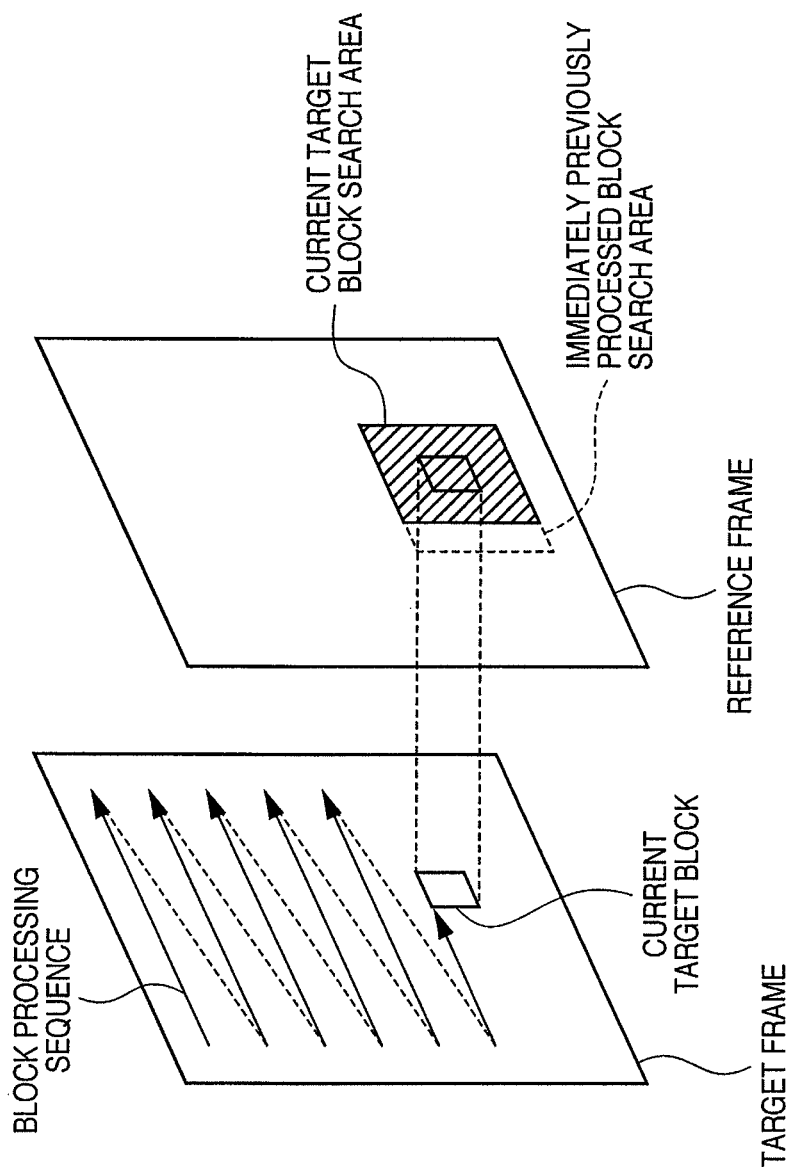
FIG. 5 is a diagram illustrating overlapping of search areas during motion detection.
Figure 6:
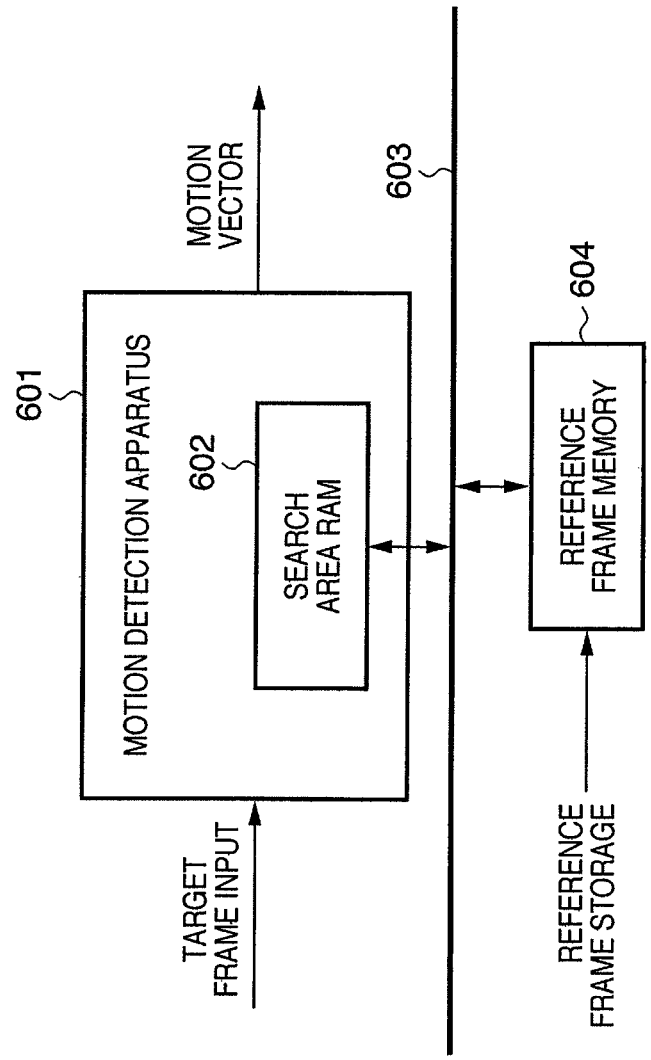
FIG. 6 is a diagram showing schematically a configuration according to a motion detection process in a conventional coding apparatus.

In the interframe prediction unit 104, interframe prediction is carried out based on motion detection using the binary image and the original image. FIG. 4 is a diagram showing an interior configuration of the interframe prediction unit 104. A description is now given of the operation of the interframe prediction unit 104 using FIG. 4.

The original image input in block units is stored in a block RAM 1041. In addition, the binary image, similarly input in block units, is stored in a binary image block RAM 1042. The binary delayed frame image read out from the binary image frame buffer 103 is stored in a binary image search area RAM 1043.

Once storage to the binary image block RAM 1042 and the binary image search area RAM 1043 is finished, motion detection based on block matching is started in a binary image motion detection unit 1045. The binary image block RAM 1042 outputs target binary image block data whenever required by the binary image motion detection unit 1045. The binary image search area RAM 1043 stores a binary image reference data group set as a search area from the reference data of the binary delay framed image used as a reference frame, and outputs reference data whenever required by the binary image motion detection unit 1045.

The binary image motion detection unit 1045 computes a search area corresponding to the target block. Then, from a reference data group included within the computed search area the binary image motion detection unit 1045 acquires from the binary image frame buffer 1043 only a new portion that excludes reference data already written in the binary image search area RAM 1043, and updates the binary image search area RAM 1043.

However, in the process of acquiring search area reference data from the buffer, a vast difference in the volume of data arises between a case in which the reference data is acquired as is in its original gradations and a case in which a binarized item is acquired as in the present embodiment. For example, if the original image has 256 gradations, then 8 bits per pixel are required and it is necessary to acquire eight times the data of the binary image. That is, by carrying out motion detection using a binary image, the volume of search area reference data transferred can be greatly reduced.

Moreover, the binary image motion detection unit 1045 reads out the target binary image block data from the binary image block RAM 1042 and carries out block matching with the binary image reference data in the search area read out from the binary image search area RAM 1043. Matching is carried out sequentially while sequentially shifting the target binary image block data with respect to the binary image reference data in the search area. The binary image motion detection unit 1045 then computes a first motion vector MVbin based on the positions then current when the degree of similarity is deemed to be at its highest, and outputs the computed motion vector MVbin to a motion detection unit 1046.

As an index of mutual degree of similarity between binary image blocks, a sum of exclusive ORs (XORSUM) between corresponding pixels is generally widely used. For example, if the pixel values of the target binary image block (x pixels×y pixels) are Orgbin (0,0)—Orgbin (x-1, y-1), and the pixel values of the corresponding binary image reference data to be matched are Refbin (0,0)—Refbin (x-1, y-1), then the XORSUM values can be obtained from the following equation (1).

$$XORSUM = \sum_{i=0,j=0}^{x-1,y-1} (Orgbin(i, j) \, XOR \, Refbin(i, j)) \qquad (1)$$

The sum of exclusive ORs becomes true each time the input values change, and therefore it can be deemed that the smaller the XORSUM value the greater the degree of similarity, and conversely, the larger the XORSUM value the smaller the degree of similarity.

In the present embodiment, the binary image motion detection unit 1045 carries out motion detection using a full-search method that performs block matching evaluation of all candidate points within the search area. However, it is possible to select as convenient the search method depending on processing time, circuit costs, and the like, and thus use of the full-search method is not a requirement.

When motion detection is finished, the binary image motion detection unit 1045 outputs the first motion vector MVbin, which is the detection result. The motion detection unit 1046, based on the first motion vector MVbin, computes the position of the search area that corresponds to the target block. Then, the motion detection unit 1046 reads out the reference data group included in the position of the search area from the frame buffer 110 and stores it in a search area RAM 1044. By using the first motion vector detected from the binary image the size of the search area computed by the motion detection unit 1046 can be made smaller than the size of the search area computed by the binary image motion detection unit 1046. As a result, the volume of data read into the search area RAM 1044 from the frame buffer 110 can be greatly reduced compared to not using the first motion vector detected from the binary image.

Next, the motion detection unit 1046 evaluates the degree of similarity between the target block data read out from the block RAM 1041 and the reference data within the search area corresponding to the target block read out from the search area RAM 1044. The degree of similarity is evaluated in terms of the results of sequential block matching while shifting the position of the reference data within the search area about search points indicated by the first motion vector MVbin. A final motion vector (second motion vector) is then detected on the basis of the positions evaluated as having the highest degree of similarity.

As an index for evaluating the degree of similarity of a multi-valued image, for example, the Sum of Absolute Differences, or SAD, between corresponding pixels is widely used, and can be used in the present invention as well. If the pixel values of the target image block (x pixels×y pixels) are Org (0,0)—Org (x-1, y-1), and the pixel values of the corresponding reference data used as the matching target are Ref (0,0)—Ref (x-1, y-1), then the SAD values can be obtained from the following equation (2).

$$SAD = \sum_{i=0, j=0}^{x-1, y-1} |Org(i, j) - Ref(i, j)| \quad (2)$$

As the difference in values between corresponding pixels shrinks the SAD value also grows smaller. Therefore, it can be deemed that the smaller the SAD value the greater the degree of similarity, and conversely, the larger the SAD value the smaller the degree of similarity.

At this point, consider the computational load of the index values that express the degree of similarity (the XORSUM in the binary image, the SAD in all other images having normal gradation) required for the block matching that is executed in the binary image motion detection unit 1045 and the motion detection unit 1046. As can be see from a comparison of equations (1) and (2) used to compute the respective degree of similarity index values, compared to the amount of computation involved in equation (2), with its addition and subtraction of multiple values, the amount of computation involved in equation (1), with its logic calculation and 1-bit-value addition, is very small. Therefore, given the same computational load, using the binary image to carry out motion detection makes it possible to evaluate degrees of similarity of many more search points and thus enables motion vector detection accuracy to be improved.

Thus, as described above, motion detection in the motion detection unit 1046 may be carried out in a relatively narrow search area around search points indicated by MVbin, if necessary in half pixel units or even ¼ pixel units. In the present embodiment, a search is made of eight points around the search points indicated by MVbin to determine the points with the highest degree of similarity. Next, motion detection is carried out around these points in units of half pixels or ¼ pixels. However, it is not always necessary to carry out all these procedures. The motion detection unit 1046, using the second motion vector determined by the search process, generates a prediction image corresponding to the target block and outputs it as an interframe prediction image (second prediction image block).

The intraframe prediction image output by the intraframe prediction unit 101 and the interframe prediction image output by the interframe prediction unit 104 are each input to the selector 105.

The selector 105, in accordance with a predetermined evaluation method, selects either the intraframe prediction image or the interframe prediction image depending on which of these images produces better coding efficiency, and outputs the selected image as a prediction image to the difference generator 106.

As a specific evaluation method of the selector 105, there is, for example, a method that compares the values of the index of the degree of similarity computed in the intraframe prediction unit 101 and the interframe prediction unit 104 (for example, the SAD value) and selects the prediction image with the higher degree of similarity (that is, the smaller SAD value). In other words, selecting the prediction image with the higher degree of similarity to the target block enables the volume of coding to be reduced and the coding efficiency to be enhanced.

In addition, selection may also be carried out by a comparison of cost information. Cost information is an index that is used to carry out selection that optimizes coding efficiency, and can be computed by taking into account bit volume when coding mode information and motion information in addition to a prediction difference amount between the original image and the prediction image.

Intraframe prediction image cost information can be computed based on the above-described SAD value and on the mode information generated when carrying out intraframe prediction.

In addition, interframe prediction image cost information can be computed based on the above-described SAD value and on the mode information generated when carrying out interframe prediction.

A specific example of a formula for calculating cost information is shown in equation (3).

$$COST = SAD + Q \times HeaderBits \quad (3)$$

In equation (3), COST is cost information obtained for each of the intraframe prediction image and the interframe prediction image. Moreover, SAD is the SAD values obtained in each of the intraframe prediction image and the interframe prediction image. Q is quantization scale information used when quantizing prediction difference information. In addition, HeaderBits expresses intraframe prediction mode information for the intraframe prediction image and motion information for the interframe prediction image.

The quantization scale information Q is computed on the basis of quantization step values used when carrying out quantization when coding image information. A quantization scale information Q computation example is shown below.

When the above-described quantization step value is Qs, quantization parameter values Qp are defined by equation (4).

$$Qp = 6 \cdot Qs + 2 \quad (4)$$

Further, as a function of the above-described quantization parameter Qp, a Lagrange multiplier is obtained by approximation and used as Q. An example of a table of correspondences between Qp and Q is shown in TABLE 1.

TABLE 1

| Qp | Q |
|---|---|
| −24-7 | 0.5 |
| 8-15 | 1 |
| 16-19 | 2 |
| 20-22 | 3 |
| 23-25 | 4 |
| 26 | 5 |
| 27 | 6 |
| 28-33 | Qp-21 |
| 34 | 13 |
| 35 | 14 |
| 36 | 16 |
| 37-42 | 32 |
| 43-48 | 64 |
| 49-54 | 128 |
| 55-60 | 256 |
| 61-66 | 512 |
| 67-75 | 1024 |

Next, a HeaderBits computation example is shown below.

In the present example, the HeaderBits expresses the bit number when converting the prediction mode information or the motion information into a bit sequence. For example, if the motion information is such that a value that is the sum of the absolute values of each component of a difference vector between the second motion vector described above and the prediction motion vector derived by a predetermined method is abs_mvd, then HeaderBits are obtained like those shown in the correspondence table shown in TABLE 2.

TABLE 2

| abs_mvd | HeaderBits |
|---|---|
| 0 | 0 |
| 1 | 1 |
| 2-3 | 2 |
| 4-7 | 3 |
| 8-15 | 4 |
| 16-31 | 5 |
| 32-63 | 6 |
| 64-127 | 7 |
| 128-255 | 8 |
| 256-511 | 9 |
| 512-1023 | 10 |
| 1024-2047 | 11 |
| 2048-4095 | 12 |
| 4096-8191 | 13 |
| 8192-16383 | 14 |
| 16384-32767 | 15 |
| 32768-65535 | 16 |

The selector 105 obtains the cost values for each of the intraframe prediction image and the interframe prediction image, and selects and outputs the prediction image deemed to have the smaller cost (the smaller coding volume).

The difference generator 106 takes the difference between the original image block and the prediction image output by the selector 105 and outputs it as a prediction difference image to the orthogonal transformation unit 107.

The orthogonal transformation unit 107, after carrying out orthogonal transformation of the prediction difference image output by the difference generator 106 and obtaining the conversion coefficient, applies a predetermined quantization scale to the conversion coefficient and quantizes it, and outputs the result as a quantized transformation coefficient to the entropy coding unit 108 and the local decoding unit 109. DCT (Discrete Cosine Transfer), Hadamard transform and the like are generally used in the orthogonal transformation that the orthogonal transformation unit 107 applies, although not limited thereto.

The entropy coding unit 108 performs entropy coding of each of the quantized transformation coefficient output by the orthogonal transformation unit 107 and either the intraframe prediction mode information, not shown, or the interframe prediction motion information, not shown, and outputs the result as a coded stream.

The local decoding unit 109 performs dequantization and reverse orthogonal transformation on the quantized transformation coefficient output by the orthogonal transformation unit 107, and outputs the result to the frame buffer 110 as a locally decoded image. The frame buffer 110 holds and stores the locally decoded image output by the local decoding unit 109, and after delaying until at least the next frame, outputs it as a delayed frame image to the interframe prediction unit 104 in response to a request from the interframe prediction unit 104. The delayed frame image is used to generate the interframe prediction image.

As described above, according to the present embodiment, in a coding apparatus that compression-codes moving images, both an intraframe prediction coding system and an interframe prediction coding system are applied and prediction coding carried out using a prediction image produced by whichever coding system is deemed to have the higher coding efficiency. Accordingly, since a very highly efficient prediction coding system is used, high coding efficiency can be achieved.

In addition, in the generation of the interframe prediction image, first, the motion vector is detected using an image having fewer gradations then the original image, and then motion detection using the original image is carried out in a search area determined using this motion vector.

Motion detection using an image with a reduced number of gradations enables the motion vector to be detected with a high degree of accuracy while reducing both reference image data transfer volume and the amount of computation. Also, because the search area for motion detection using the original image with the original number gradations and the reference data is determined on the basis of this motion vector, the search area can be made sufficiently small. Therefore, the volume of multi-gradation reference data used in the search and read out from the frame buffer can be greatly reduced.

Thus, as described above, the present invention enables high coding efficiency moving-image coding to be carried out while reducing both the amount of computation and the data transfer volume.

Second Embodiment

As a second embodiment of the present invention, the input of the binary image frame buffer 103 shown in FIG. 1 may be changed to a local decoding binary image and the same effect as in the first embodiment still obtained. A binary processing unit is provided and the output of the local decoding unit 109 is binarized and input to the binary image frame buffer 103. Although this embodiment requires a binary processing unit, it does make it possible to achieve coding having higher prediction-coding accuracy by using the locally decoded image.

Other Embodiments

In the embodiments described above, a description is given of a configuration that detects the first motion vector using a binary image. However, as can be easily understood by those of skill in the art, it is also possible to achieve the same effect by extracting the high-frequency components of the original image and using an image having an arbitrary number of gradations of reduced gradation number. Therefore, the binary image conversion unit 102 may be configured as a N-ary image conversion unit (M>N≥2; where, at M>2, M is the number of gradations of the original image), with an N-arized image used instead of the binary image and SAD used instead of XORSUM as the evaluation value.

Moreover, the moving image coding apparatus of the embodiments described above generates prediction images in both the intraframe prediction unit 101 and the interframe prediction unit 104, selects one of the two at the selector 105, and provides the selected predict image to the difference generator 106 to generate a prediction difference image. However, prediction difference images may be generated at and output from both the intraframe prediction unit 101 and the interframe prediction unit 104, with one of the images selected at the selector 105 and supplied to the orthogonal transformation unit 107.

In such a case, at the intraframe prediction unit 101 the difference between the original image and the generated intraframe prediction image may be output as an intraframe prediction difference image, while at the interframe prediction unit 104 the difference between the original image and the generated interframe prediction image may be output as an interframe prediction difference image.

The embodiments described above can also be implemented as software by a system or an apparatus computer (or CPU, MPU or the like).

Therefore, a computer program supplied to a computer in order to implement the embodiment described above by such computer itself also implements the present invention. That is, a computer program for implementing the function of the embodiment described above is itself within the scope of the present invention.

It should be noted that a computer program for implementing the embodiment described above may be in any form provided that it is computer-readable. Such a program may be executed in any form, such as an object code, a program executed by an interpreter, or script data supplied to an OS, but is not limited thereto.

Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a non-volatile semiconductor memory or the like.

As for the method of supplying the program using wire/wireless communications, there is, for example, a method in which a data file (program data file), either a computer program itself that forms the invention or a file or the like that is compressed and automatically installed, and capable of becoming the computer program that comprises the invention on a client computer, is stored on a server on a computer network. The program data file may be in an executable format, or it may be in the form of source code.

Then, the program data file is supplied by downloading to a connected client computer accessing the server. In this case, the program data file may also be divided into a plurality of segment files and the segment files distributed among different servers.

In other words, a server device that provides program data files for implementing the functional processes of the present invention by computer to one or more client computers is also covered by the claims of the present invention.

It is also possible to encrypt and store the program of the present invention on a storage medium, distribute the storage medium to users, allow users who meet certain requirements to download decryption key data from a website via the Internet, and allow these users to decrypt the encrypted program by using the key data, whereby the program is installed in the user computer.

Besides cases where the aforementioned functions according to the embodiments are implemented by executing the read program by computer, an operating system or the like running on the computer may perform all or a part of the actual processing, so that the functions of the foregoing embodiment can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or part of the actual processing so that the functions of the foregoing embodiment can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-238168, filed on Sep. 1, 2006, which is hereby incorporated by reference herein in its entirety.

What is claimed is:

1. An image coding apparatus that codes a frame of a moving image in units of blocks, comprising:
an intraframe prediction unit that generates, for an input moving image target block, a first prediction image block from within a same frame as said target block;
an interframe prediction unit that generates, for said target block, a second prediction image block from within a frame different from that of said target block;
a selection unit that selects one of either said intraframe prediction unit or said interframe prediction unit in accordance with a predetermined evaluation method;
an image high-frequency component extraction unit that extracts a high-frequency component of said target block;
an N-ary image conversion unit that reduces a number of gradations of said high-frequency component of said target block to generate an N-arized target block, where N is an integer equal to or greater than 2; and
a storage unit that stores output of said N-ary image conversion unit,
said interframe prediction unit comprising:
a motion detection unit that detects motion of said N-arized target block using output of said N-ary image conversion unit and output from said storage unit; and
a prediction image generation unit that generates said second prediction block based on detection results detected by said motion detection unit.

2. The image coding apparatus according to claim 1, wherein said high-frequency component extraction unit comprises a low-pass filter unit and extracts a high-frequency component from a difference between before application of said low-pass filter unit and after application of said low-pass filter unit.

3. The image coding apparatus according to claim 1, wherein said selection unit selects from between said first prediction image block and said second prediction image block that prediction image block which has a higher degree of similarity to said target block.

4. The image coding apparatus according to claim 1, wherein said selection unit selects either said first prediction image block or said second prediction image block based on a comparison of first cost information for said first prediction image block computed using a degree of similarity to said target block and prediction mode information in said interframe prediction unit with second cost information for said second prediction image block computed using the degree of similarity to said target block and detection results in said interframe prediction unit.

5. The image coding apparatus according to claim 1, wherein said N-ary image conversion unit is a binary image conversion unit.

6. An image coding apparatus that codes a frame of a moving image in units of blocks, comprising:
- an intraframe prediction unit that generates, for an input moving image target block, a first prediction image block from within a same frame as said target block;
- an interframe prediction unit that generates, for said target block, a second prediction image block from within a frame different from that of said target block;
- a selection unit that selects one of either said intraframe prediction unit or said interframe prediction unit in accordance with a predetermined evaluation method;
- a local decoding unit that locally decodes a coded image;
- an image high-frequency component extraction unit that extracts a high-frequency component;
- a first N-ary image conversion unit that reduces a number of gradations of said high-frequency component of said target block to generate an N-arized target block, where N is an integer equal to or greater than 2;
- a second N-ary image conversion unit that reduces the number of gradations of an output image of said local decoding unit and generates an N-arized image, where N is an integer equal to or greater than 2; and
- a storage unit that stores output of said second N-ary image conversion unit,
- said interframe prediction unit comprising:
- a motion detection unit that detects motion of said N-arized target block using output of said first N-ary image conversion unit and output from said storage unit; and
- a prediction image generation unit that generates said second prediction block based on detection results detected by said motion detection unit.

7. An image coding method for coding a frame of a moving image in units of blocks, comprising:
- intraframe prediction step of generating, for an input moving image target block, a first prediction image block from within a same frame as said target block;
- interframe prediction step of generating, for said target block, a second prediction image block from within a frame different from that of said target block;
- selection step of selecting one of either said intraframe prediction step or said interframe prediction step in accordance with a predetermined evaluation method;
- image high-frequency component extraction step of extracting a high-frequency component of said target block;
- N-ary image conversion step of reducing a number of gradations of said high-frequency component of said target block to generate an N-arized target block, where N is an integer equal to or greater than 2; and
- storage step of storing results of said N-ary image conversion step in a storage unit,
- said interframe prediction step comprising:
- motion detection step of detecting motion of said N-arized target block using results of said N-ary image conversion step and information stored in said storage unit; and
- prediction image generation step of generating said second prediction block based on detection results detected in said motion detection step.

8. An image coding method for coding a frame of a moving image in units of blocks, comprising:
- intraframe prediction step of generating, for an input moving image target block, a first prediction image block from within a same frame as said target block;
- interframe prediction step of generating, for said target block, a second prediction image block from within a frame different from that of said target block;
- selection step of selecting one of either said intraframe prediction step or said interframe prediction step in accordance with a predetermined evaluation method;
- local decoding step of locally decoding a coded image;
- image high-frequency component extraction step of extracting a high-frequency component of said target block;
- first N-ary image conversion step of reducing a number of gradations of said high-frequency component of said target block to generate an N-arized target block, where N is an integer equal to or greater than 2;
- second N-ary image conversion step of reducing the number of gradations of an output image in said local decoding step and generating an N-arized image, where N is an integer equal to or greater than 2; and
- storage step of storing output of said second N-ary image conversion step in a storage unit,
- said interframe prediction step comprising:
- motion detection step of detecting motion of said N-arized target block using output of said first N-ary image conversion step and output from said storage unit; and
- prediction image generation step of generating said second prediction block based on detection results detected in said motion detection step.

9. A non-transitory computer-readable storage medium retrievably storing a program for causing a computer to execute an image coding method for coding a frame of a moving image in units of blocks, the program comprising:
- code for an intraframe prediction step of generating, for an input moving image target block, a first prediction image block from within a same frame as said target block;
- code for an interframe prediction step of generating, for said target block, a second prediction image block from within a frame different from that of said target block;
- code for a selection step of selecting one of either said intraframe prediction step or said interframe prediction step in accordance with a predetermined evaluation method;
- code for an image high-frequency component extraction step of extracting a high-frequency component of said target block;
- code for an N-ary image conversion step of reducing a number of gradations of said high-frequency component of said target block to generate an N-arized target block, where N is an integer equal to or greater than 2; and
- code for a storage step of storing results of said N-ary image conversion step in a storage unit,
- said interframe prediction step comprising:
- code of a motion detection step of detecting motion of said N-arized target block using results of said N-ary image conversion step and information stored in said storage unit; and
- code for a prediction image generation step of generating said second prediction block based on detection results detected in said motion detection step.

10. A non-transitory computer-readable storage medium retrievably storing a program for causing a computer to execute an image coding method for coding a frame of a moving image in units of blocks, the program comprising:

code for an intraframe prediction step of generating, for an input moving image target block, a first prediction image block from within a same frame as said target block;

code for an interframe prediction step of generating, for said target block, a second prediction image block from within a frame different from that of said target block;

code for a selection step of selecting one of either said intraframe prediction step or said interframe prediction step in accordance with a predetermined evaluation method;

code for a local decoding step of locally decoding a coded image;

code for an image high-frequency component extraction step of extracting a high-frequency component of said target block;

code for a first N-ary image conversion step of reducing a number of gradations of said high-frequency component of said target block to generate an N-arized target block, where N is an integer equal to or greater than 2;

code for a second N-ary image conversion step of reducing the number of gradations of an output image in said local decoding step and generating an N-arized image, where N is an integer equal to or greater than 2; and code for a storage step of storing output of said second N-ary image conversion step in a storage unit, said interframe prediction step comprising:

code for a motion detection step of detecting motion of said N-arized target block using output of said first N-ary image conversion step and output from said storage unit; and code for a prediction image generation step of generating said second prediction block based on detection results detected in said motion detection step.

* * * * *